United States Patent [19]

Rice et al.

[11] Patent Number: 5,014,507
[45] Date of Patent: May 14, 1991

[54] DIRECT DRIVE GASEOUS HYDROGEN TURBO ACTUATOR

[75] Inventors: John N. Rice; Richard W. Reynolds, both of Rockford, Ill.

[73] Assignee: Sundstrand Corporation, Rockford, Ill.

[21] Appl. No.: 450,531

[22] Filed: Dec. 14, 1989

[51] Int. Cl.⁵ .............................................. F02K 9/42
[52] U.S. Cl. ........................................ 60/204; 60/259; 60/260; 137/599.1
[58] Field of Search ................. 60/204, 259, 260, 257; 137/599.1, 601; 244/169, 164

[56] References Cited

U.S. PATENT DOCUMENTS

| | | | |
|---|---|---|---|
| 2,701,441 | 2/1955 | Mitchell | 60/259 |
| 2,911,912 | 11/1959 | Wetherbee, Jr. | 60/259 |
| 3,028,729 | 4/1962 | Ledwith | 60/259 |
| 3,049,870 | 8/1962 | Chamberlain | 60/260 |
| 3,062,004 | 11/1962 | Dooley et al. | 60/259 |
| 3,077,073 | 2/1963 | Kuhrt . | |
| 3,085,393 | 4/1963 | Hamlin, Jr. | 60/260 |
| 3,136,121 | 6/1964 | Barger et al. | 60/259 |
| 3,224,189 | 12/1965 | Kenny | 60/259 |
| 3,230,708 | 1/1966 | Huang et al. . | |
| 3,426,972 | 2/1969 | Osburn . | |
| 3,446,437 | 5/1969 | McCullough et al. . | |
| 3,532,304 | 10/1970 | Pyptiuk . | |
| 4,140,290 | 2/1979 | Meier et al. . | |
| 4,171,615 | 10/1979 | Stewart et al. | 60/259 |
| 4,585,191 | 4/1986 | Blount . | |

Primary Examiner—Donald E. Stout

Attorney, Agent, or Firm—Antonelli, Terry, Stout & Kraus

[57] ABSTRACT

A propulsion engine (12) which combusts propellant received from the storage tank (24) in which a portion (28) of the tank contains propellant in the liquid state and in which an ullage (26) in a remaining portion of the tank contains the propellant in a gaseous state including a first propellant circuit (34) coupling liquid propellant stored in the tank to an evaporator (30); a second propellant circuit (36), coupling the gaseous propellant from the evaporator to the propulsion engine combustor and to the ullage; at least one power generating device (14 and 16) disposed in the second propellant circuit between the evaporator and the ullage, for providing a power output from energy of the gaseous propellant flowing in the second propellant circuit controlled by at least one control valve controlling a flow of gaseous propellant to the at least one device under the control of at least one valve control signal; a bypass circuit (40) coupled in parallel with the at least one power generating device containing a bypass valve (42) controlling flow of gaseous propellant through the bypass circuit from the evaporator to the ullage in response to a bypass valve control signal; and a controller (44) coupled to the bypass valve and the at least one control valve, for generating the valve control signal controlling the flow of gaseous propellant through the valves to produce a controlled mass flow of gaseous propellant into the ullage independent of variation of a mass of gas flow through the valves.

27 Claims, 2 Drawing Sheets

DIRECT DRIVE GASEOUS HYDROGEN TURBO ACTUATOR

CROSS REFERENCE TO RELATED APPLICATION

Reference is made to U.S. patent application Ser. No. 256,864 entitled "Turbo Hydraulic Unitized Actuator" filed on Oct. 12, 1988 which is incorporated by reference in its entirety.

TECHNICAL FIELD

The present invention relates to actuators utilized in propulsion systems which are powered by gas flowing to an ullage in a storage tank.

BACKGROUND ART

United States patent application Ser. No. 256,864 discloses an actuator which is powered by gaseous propellant flowing from an evaporator thermally coupled to a thrust engine to an ullage of a storage tank storing liquid propellant in a portion of the storage tank. The actuator disclosed in Ser. No. 256,864 does not dynamically control the mass flow of gaseous propellant to the ullage as a function of power being outputted by a power takeoff driven by the gaseous propellant flowing to the ullage. A parallel gas path bypasses a minimum mass flow of gas past the power takeoff to provide a mass flow necessary to maintain the ullage at a desired pressure. An expansion valve contained in the parallel gas path does not dynamically vary the flow of gas in the path as a function of power outputted from the power takeoff. Gas discharged from the power takeoff is added to the minimum mass flow in the parallel gas path which is necessary to maintain the ullage. As a result, an overpressure condition can be created within the ullage which must be relieved by an overpressure valve which vents excess gas overboard. Therefore, a maximum power output from the gaseous propellant flowing to the ullage is not obtained as a consequence of a mass greater than that necessary to maintain the ullage flowing to the ullage necessitating venting overboard from the ullage.

Turbo actuators which are powered by a gas generator for driving a load in propulsion systems having first and second turbines which rotate in opposite directions to drive a common shaft are known. These systems utilize a control valve which divides a gas supply from a solid propellant gas generator between wheels of the turbine by directing the gas flow from one turbine to the other at a fixed frequency with pulse duration modulation. See "Turbo-Actuators Turn Flow Into Mechanical Output" by P. H. Stahlhuth, *Hydraulics & Pneumatics*, April 1974, pp. 89–92.

DISCLOSURE OF INVENTION

The present invention is an improvement over the turbo actuator disclosed in Ser. No. 256,864. The invention provides a power takeoff from energy contained in the gas stream flowing to an ullage in a propellant storage tank which maximizes energy obtained from the gas flow by controlling the net mass flow into the ullage as a function of power outputted by a power takeoff within the gas flow to the ullage. The net mass flow is controlled so as to maintain a predetermined pressure within the ullage which increases efficiency over the prior art system described in Ser. No. 256,864 in that the total mass flow into the ullage is controlled to maintain the predetermined pressure in contrast to the system of Ser. No. 256,864 which bypassed a minimum mass flow past a power takeoff which was necessary to maintain pressure in the ullage. With the invention, the net mass flow to the ullage is controlled by variation of the mass flow of gas in a bypass circuit coupled in parallel to a power generating device contained in a gas circuit returning gas to the ullage. A controlled mass flow of gas to the ullage occurs independent of variation of mass of gas flow through the power generating device. As the power output produced by the power takeoff varies, the controlled mass flow of gas to the ullage is produced by varying the mass flow through the bypass circuit so that the net controlled mass flow to the ullage occurs independent of variation of the power output from the power takeoff.

A propulsion system having a propulsion engine which combusts propellant received from a storage tank in which a portion of the tank contains propellant in a liquid state and in which an ullage in a remaining portion of the tank contains the propellant in a gaseous state in accordance with the invention includes a first propellant circuit coupling liquid propellant stored in the portion of the tank storing the propellant in a liquid state to an evaporator thermally coupled to the engine for gasifying the liquid propellant; a second propellant circuit, coupling the gaseous propellant from the evaporator to the propulsion engine, for combustion by the engine and to the ullage; at least one power generating device, disposed in the second propellant circuit between the evaporator and the ullage, for providing a power output from energy of the gaseous propellant flowing in the second propellant circuit controlled by at least one control valve controlling a flow of gaseous propellant to the at least one device under the control of at least one valve control signal; a bypass circuit coupled in parallel with the at least one power generating device containing a bypass valve controlling flow of gaseous propellant through the bypass circuit from the evaporator to the ullage in response to a bypass valve control signal; and a controller, coupled to the bypass valve and the control valve, for generating the valve control signals controlling the flow of gaseous propellant through the valves to produce a controlled mass flow of gaseous propellant into the ullage independent of variation of a mass gas flow through the first and second valves. The controller is responsive to a command for causing variation of the power output produced by the at least one device in the second circuit and varies the control signals to produce a commanded power output and the flow of gaseous propellant in the bypass circuit and the controlled mass flow of gaseous propellant into the ullage. The controller produces the control signal for the bypass valve as a function of a difference between a mass flow rate of gaseous propellant required to maintain the ullage at a predetermined pressure and a mass flow of gaseous propellant to the device required to produce the commanded power output. The controller is responsive to an actual pressure in the ullage sensed by a pressure sensor, a set ullage pressure which is a desired pressure in the ullage to be maintained and a flow rate of liquid propellant in the first propellant circuit. The invention further comprises an actuator controlling an orientation of a thrust vector produced by the propulsion engine, the actuator being powered by the at least one device and the orientation being controlled by the command applied to the controller with the controller converting the command into the control signals. The power generating device comprises a first turbine for applying torque to a rotatable shaft of the actuator in a first direction and a second turbine for applying torque to the rotatable shaft in a second direction opposite to the first direction. The at least one control valve comprises a first control valve disposed in the second propellant circuit in series with the first turbine and a second control valve disposed in the second propellant circuit in series with the second turbine. The controller generates a first valve control signal applied to the first valve and a second control signal applied to the second control valve with the controller controlling a relative amount of torque produced in the first and second directions as a function of the command. The bypass valve comprises a valve having a variable area orifice with an area of the orifice being a function of the bypass control signal to control mass flow through the orifice.

A method of generating a power output from a gas flowing in a gas circuit having parallel connected first and second paths to an ullage in a tank which stores a liquid form of the gas in a portion of the tank in accordance with the invention includes controlling a flow of gas in the first path in which is disposed at least one power generating device for providing a controlled power output from energy of the gas flowing in the first path; and controlling the flow of gas in the second path so that a controlled mass flow of gas to the ullage occurs through the gas circuit independent of variation of a mass of gas flow in the first and second paths. The power output is a function of a command applied to a controller which controls the flow of gas through the paths. The command is a position command for controlling a vector of thrust produced by a propulsion engine having an orientation controlled by an actuator driven by the power output.

BEST MODE FOR CARRYING OUT THE INVENTION

Figure 1:
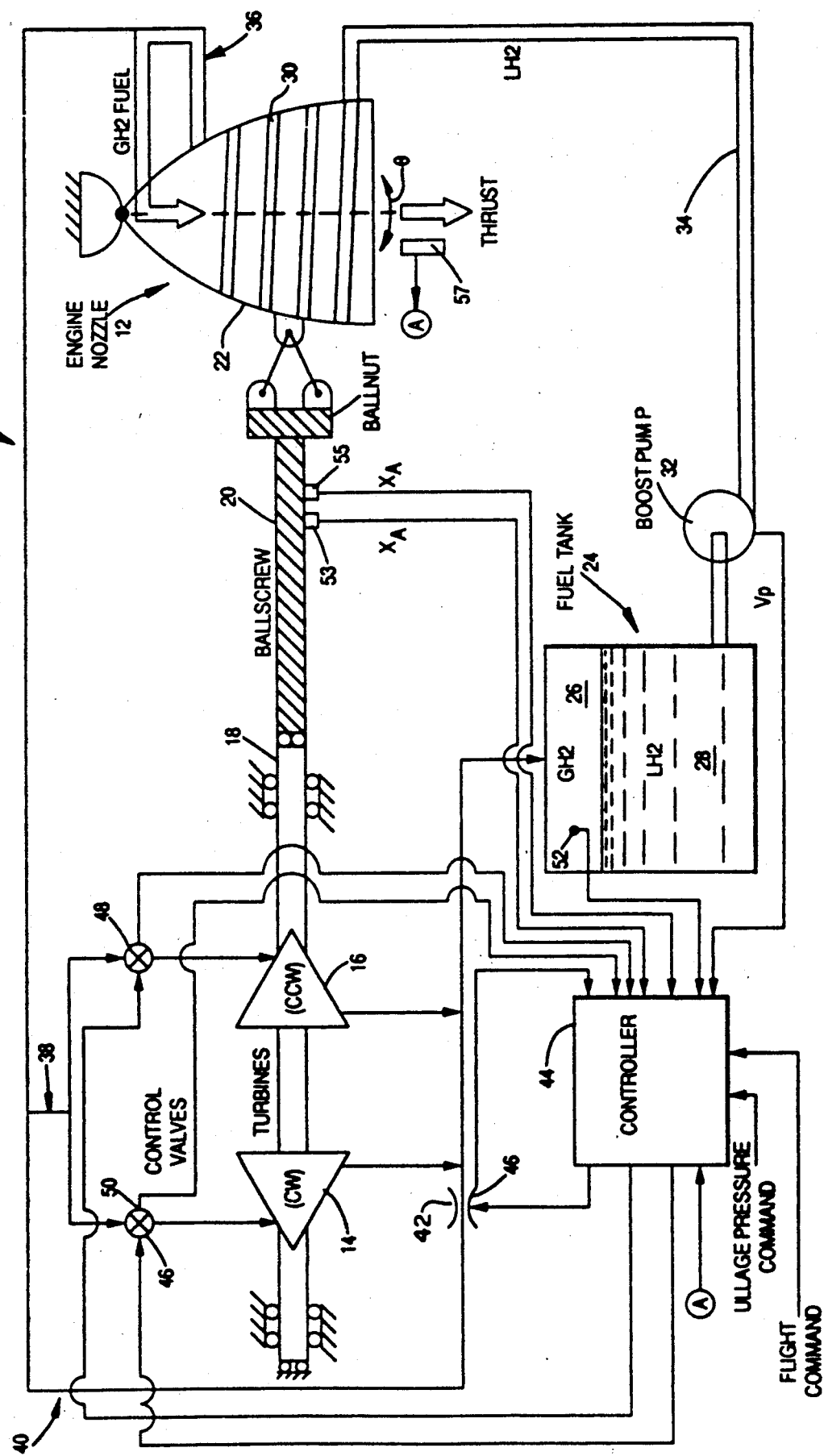
FIG. 1 illustrates a block diagram of an embodiment of the present invention.

FIG. 1 illustrates an embodiment 10 of the present invention. A preferred application of the present invention is in controlling the orientation of a thrust vector produced by a rocket engine 12 of conventional construction. The present invention produces a power takeoff from at least one power generating device which is preferably a pair of turbines 14 and 16 which rotate in opposite directions to drive a rotary shaft 18 which drives a ball screw 20 which changes the orientation of a bell housing 22 of the rocket engine from gaseous propellant which preferably is hydrogen gas $GH_2$ flowing back to the ullage 26 of a tank 24. The tank 24 contains liquid propellant which preferably is liquid hydrogen $LH_2$ in a portion 28 which is in fluid communication with an evaporator 30 in thermal contact with the bell housing 22 of the rocket engine. The evaporator 30 is an internal part of the bell housing 22 of the rocket and is comprised of a fluid flow path through the bell housing. A boost pump 32 pumps liquid propellant from the portion 28 through a first propellant circuit 34 to the evaporator 30. The heat from the rocket engine is thermally coupled to the liquid propellant which enters the evaporator 30 and causes the liquid propellant to be gasified by the time of discharge from the evaporator. A second propellant circuit 36 couples gaseous propellant discharged from the evaporator 30 to the propulsion engine 12 for combustion and to the ullage 26.

The second propellant circuit 36 has a first path 38 in which the at least one power generating device which is preferably the pair of turbines 14 and 16 and a second path 40 containing a bypass control valve 42 which controls the mass flow of gaseous propellant in the second path. Preferably, the bypass control valve 42 has a variable area orifice in which the area of the orifice is controlled by a control signal produced by controller 44 as described below. A position sensor 46 monitors the actual position of the control surface within the variable orifice area valve 42 which is applied to controller 44 as described below. The first path 38 contains a first control valve 46 and a second control valve 48 in series respectively with the turbines 14 and 16 which control, respectively, the flow of gaseous propellant to the first turbine and the second turbine in response to control signals produced by the controller 44 as described below. While the valves 46 and 48 are illustrated in series respectively upstream of the turbines 14 and 16, the valves may alternatively be located downstream in series with the turbines. A position detector 50 is associated with each of the control valves which provides a signal to the controller 44 of the actual position of the control valves. A position sensor 53 applies a signal X, which specifies the position of the actuator ballscrew, to the controller 44. A position sensor 55 applies a signal X, which specifies the velocity of the actuator ballscrew 20 to the controller 44.

The controller 44 is responsive to a flight command which controls the thrust vector orientation $\Theta$ of the bell housing 22. The controller 44 is also responsive to a specified ullage pressure command which is the pressure at which it is desired to maintain the ullage 26. A pressure transducer 52 provides the controller 44 with the actual pressure within the ullage 26. The controller 44 functions to vary the orifice area of the variable orifice valve 42 as a function of the flight command and ullage pressure command to produce a commanded power output from the at least one power generating device to cause the bell housing 22 to assume a commanded position determined by the flight command while controlling the mass flow of the gaseous propellant to the ullage 26 so as to maintain the ullage pressure commanded by the ullage pressure command. As the power requirements of the at least one power generating device vary the area of the orifice of the variable orifice valve 42 is varied so as to maintain the controlled mass flow of gaseous propellant to the ullage 26 independent of the mass flow through either of the first path 38 or second path 40 necessary to maintain the desired ullage pressure. The control of the turbines 14 and 16 by the controller 44 while not being limited thereto may be in accordance with the aforementioned publication. By controlling the mass flow into the ullage 26, maximum energy is obtained from the gas stream flowing to the ullage as a consequence of the variable area orifice valve 42 being controllable to vary the mass flow of gas flowing to the ullage 26 independent of the power requirements for the at least one power generating device. In contrast to the prior art which required the bypass to have a minimum mass flow rate of gaseous propellant which would maintain pressurization of the ullage, the present invention permits throttling of the flow rate in the second path 40 down to zero while maintaining the pressure set by the ullage pressure command applied to the controller 44.

Figure 2:
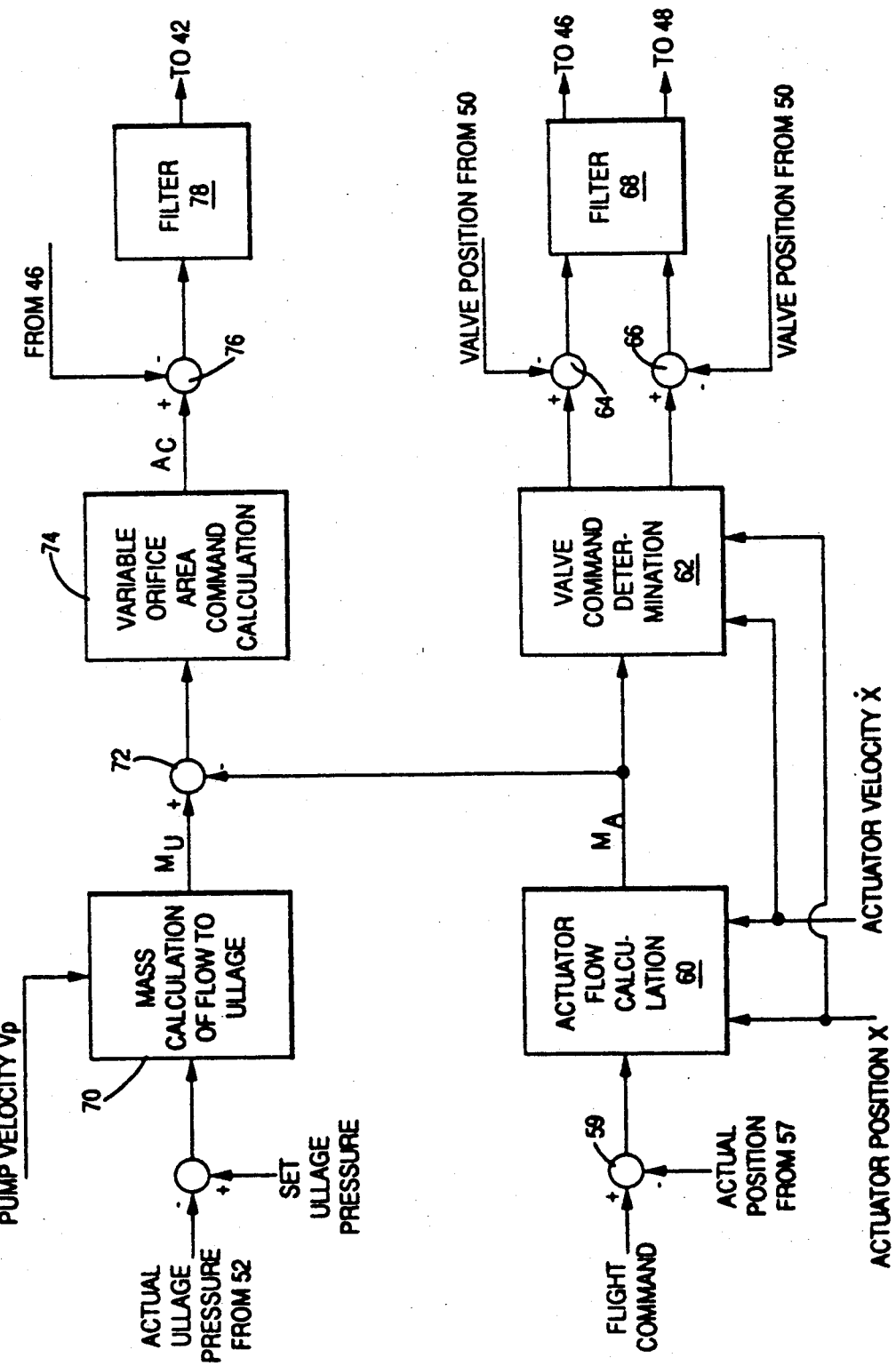
FIG. 2 illustrates a block diagram of a suitable controller utilized in the block diagram of FIG. 1.

FIG. 2 illustrates a block diagram of an implementation of the controller 44. Like reference numerals identify like parts in FIGS. 1 and 2. The control of the valves 46 and 48 is controlled by the flight command applied to the controller 44. The flight command specifies an angle Θ which is the desired orientation of the thrust vector produced by the rocket engine 12. The flight command is compared with an actual position of the thrust vector determined by the sensor 57. An error signal is applied to an actuator flow calculation algorithm 60 which is a function of the sensed velocity and position of the ball screw 20 sensed by sensors 53 and 55. The actuator flow calculation algorithm 60 calculates the mass of gas $M_A$ necessary to move the ball screw 20 to the desired position. A valve command determination algorithm 62, which is also a function of the ball screw position and velocity, calculates the amount of gas to be respectively applied to the turbines 14 and 16. The actual calculation of the amount of gas to be respectively applied to the turbines 14 and 16 may be generally in accordance with the teachings of the aforementioned publication. Each of the commands to be applied to the valves 46 and 48 is compared with a sensed position produced by sensor 50 by subtractors 64 and 66 to produce a command to cause the position of the valves 46 and 48 to move from the sensed position to the actual position. A suitable filter 68 is added to remove transients from the error signal. The outputs of the filter are respectively applied to the controls of the valves 46 and 48. Control of the variable area orifice valve 42 is a function of a calculated mass of gaseous propellant which is necessary to flow to the ullage 26 to maintain the set ullage pressure. A mass calculation algorithm 70 calculates the necessary controlled mass flow Mu to the ullage as a function of an error signal proportional to a difference between the actual ullage pressure sensed by sensor 52 and a set ullage pressure which is the desired pressure to be maintained in the ullage and the velocity of the boost pump 32. A subtractor 72 calculates the difference between the mass flow $M_A$ necessary to produce the commanded orientation of the thrust vector and the total mass flow through the turbines 14 and 16 $M_A$ which is equal to the flow through the second path 40 passed by the variable area orifice 42. The mass flow calculated by the subtractor 72 is applied to a variable orifice area command calculation algorithm 74 which converts the mass flow through the second path 40 into an actual command to be applied to the variable area orifice valve 46. An error signal is produced by subtractor 76 by calculating the difference between the commanded position of the variable orifice valve 42 and the position sensed by the sensor 46. A suitable filter 78 removes transients from the signal prior to application to the variable area orifice valve. Each of the aforementioned algorithms are based upon known flow equations.

While the preferred application of the present invention is for controlling a thrust vector in a rocket engine, the present invention may be utilized to produce power takeoffs from the gas stream flowing back to the ullage in an airframe propulsion system such as a rocket engine which is not used for controlling the orientation of the thrust vector produced by the rocket engine. For example, power could be generated by a turbine for generating auxiliary electrical or hydraulic power. While the invention has been described in terms of its preferred embodiment in an application in a rocket engine for controlling a thrust vector produced by a rocket engine, it should be understood that numerous modifications may be made to the invention without departing from the spirit and scope of the invention as defined in the appended claims. It is intended that all such modifications fall within the scope of the appended claims.

We claim:

1. A propulsion system having a propulsion engine which combusts propellant received from a storage tank in which a portion of the tank contains propellant in a liquid state and in which an ullage in a remaining portion of the tank contains the propellant in a gaseous state comprising:
   a first propellant circuit coupling liquid propellant stored in the portion of the tank storing the propellant in a liquid state to an evaporator thermally coupled to the propulsion engine for gasifying the liquid propellant;
   a second propellant circuit coupling the gaseous propellant from the evaporator to the propulsion engine for combustion by the engine and to the ullage;
   at least one power generating device, disposed in the second propellant circuit between the evaporator and the ullage, for providing a power output from energy of the gaseous propellant flowing in the second propellant circuit controlled by at least one control valve controlling a flow of gaseous propellant to the at least one device under the control of at least one valve control signal;
   a bypass circuit coupled in parallel with the power generating device containing a bypass valve controlling flow of gaseous propellant through the bypass circuit from the evaporator to the ullage in response to a bypass valve control signal; and
   a controller, coupled to the bypass valve and the at least one control valve, for generating the valve control signals controlling the flow of gaseous propellant through the valves to produce a controlled mass flow of gaseous propellant into the ullage independent of variation of a mass of gas flow through the valves.

2. A propulsion system in accordance with claim 1 wherein:
   the controller is responsive to a command for causing variation of the power output produced by the at least one device in the second propellant circuit and varies the control signals to produce a commanded power output and the flow of gaseous propellant in the bypass circuit and the controlled mass flow of gaseous propellant into the ullage.

3. A propulsion system in accordance with claim 2 wherein:
   the controller produces the control signal for the bypass valve as a function of a difference between a mass flow rate of gaseous propellant required to maintain the ullage at a predetermined pressure and a mass flow of gaseous propellant to the at least one device required to produce the commanded power output.

4. A propulsion system in accordance with claim 3 wherein:
   the controller is responsive to an actual pressure in the ullage sensed by a pressure sensor, a set ullage pressure which is a pressure in the ullage to be maintained and a flow rate of liquid propellant in the first propellant circuit.

5. A propulsion system in accordance with claim 1 further comprising:

an actuator controlling an orientation of a thrust vector produced by the propulsion engine, the actuator being powered by the at least one device and the orientation being controlled by a command applied to the controller with the controller converting the command into the control signals.

6. A propulsion system in accordance with claim 2 further comprising:

an actuator controlling an orientation of a thrust vector produced by the propulsion engine, the actuator being powered by the at least one device and the orientation being controlled by the command with the controller converting the command into the control signals.

7. A propulsion system in accordance with claim 3 further comprising:

an actuator controlling an orientation of a thrust vector produced by the propulsion engine, the actuator being powered by the at least one device and the orientation being controlled by the command with the controller converting the command into the control signals.

8. A propulsion system in accordance with claim 4 further comprising:

an actuator controlling an orientation of a thrust vector produced by the propulsion engine, the actuator being powered by the at least one device and the orientation being controlled by the command with the controller converting the command into the control signals.

9. A propulsion system in accordance with claim 5 wherein the at least one device comprises a first turbine for applying torque to a rotatable shaft of the actuator in a first direction and a second turbine for applying torque to the rotatable shaft in a second direction opposite to the first direction;

the at least one control valve comprises a first control valve disposed in the second propellant circuit in series with the first turbine and a second control valve disposed in the second propellant circuit in series with the second turbine; and the controller generates a first valve control signal applied to the first valve and a second control signal applied to the second control valve with the controller controlling a relative amount of torque produced in the first and second directions as a function of the command.

10. A propulsion system in accordance with claim 6 wherein:

the at least one device comprises a first turbine for applying torque to a rotatable shaft of the actuator in a first direction and a second turbine for applying torque to the rotatable shaft in a second direction opposite to the first direction;

the at least one control valve comprises a first control valve disposed in the second propellant circuit in series with the first turbine and a second control valve disposed in the second propellant circuit in series with the second turbine; and the controller generates a first valve control signal applied to the first valve and a second control signal applied to the second control valve with the controller controlling a relative amount of torque produced in the first and second directions as a function of the command.

11. A propulsion system in accordance with claim 7 wherein:

the at least one device comprises a first turbine for applying torque to a rotatable shaft of the actuator in a first direction and a second turbine for applying torque to the rotatable shaft in a second direction opposite to the first direction;

the at least one control valve comprises a first control valve disposed in the second propellant circuit in series with the first turbine and a second control valve disposed in the second propellant circuit in series with the second turbine; and the controller generates a first valve control signal applied to the first valve and a second control signal applied to the second control valve with the controller controlling a relative amount of torque produced in the first and second directions as a function of the command.

12. A propulsion system in accordance with claim 8 wherein:

the at least one device comprises a first turbine for applying torque to a rotatable shaft of the actuator in a first direction and a second turbine for applying torque to the rotatable shaft in a second direction opposite to the first direction;

the at least one control valve comprises a first control valve disposed in the second propellant circuit in series with the first turbine and a second control valve disposed in the second propellant circuit in series with the second turbine; and the controller generates a first valve control signal applied to the first valve and a second control signal applied to the second control valve with the controller controlling a relative amount of torque produced in the first and second directions as a function of the command.

13. A propulsion system in accordance with claim 1 wherein the bypass valve comprises:

a valve having a variable area orifice with an area of the orifice being a function of the bypass valve control signal.

14. A propulsion system in accordance with claim 2 wherein the bypass valve comprises:

a valve having a variable area orifice with an area of the orifice being a function of the bypass valve control signal.

15. A propulsion system in accordance with claim 3 wherein the bypass valve comprises:

a valve having a variable area orifice with an area of the orifice being a function of the bypass valve control signal.

16. A propulsion system in accordance with claim 4 wherein the bypass valve comprises:

a valve having a variable area orifice with an area of the orifice being a function of the bypass valve control signal.

17. A propulsion system in accordance with claim 5 wherein the bypass valve comprises:

a valve having a variable area orifice with an area of the orifice being a function of the bypass valve control signal.

18. A propulsion system in accordance with claim 6 wherein the bypass valve comprises:

a valve having a variable area orifice with an area of the orifice being a function of the bypass valve control signal.

19. A propulsion system in accordance with claim 7 wherein the bypass valve comprises:

a valve having a variable area orifice with an area of the orifice being a function of the bypass valve control signal.

20. A propulsion system in accordance with claim 8 wherein the bypass valve comprises:
a valve having a variable area orifice with an area of the orifice being a function of the bypass valve control signal.

21. A propulsion system in accordance with claim 9 wherein the bypass valve comprises:
a valve having a variable area orifice with an area of the orifice being a function of the bypass valve control signal.

22. A propulsion system in accordance with claim 10 wherein the bypass valve comprises:
a valve having a variable area orifice with an area of the orifice being a function of the bypass valve control signal.

23. A propulsion system in accordance with claim 11 wherein the bypass valve comprises:
a valve having a variable area orifice with an area of the orifice being a function of the bypass valve control signal.

24. A propulsion system in accordance with claim 12 wherein the bypass valve comprises:
a valve having a variable area orifice with an area of the orifice being a function of the bypass valve control signal.

25. A method of generating a power output from a gas flowing in a gas circuit having parallel first and second paths to an ullage in a tank which stores a liquid form of the gas in a portion of the tank comprising:
controlling a flow of gas in the first path in which is disposed at least one power generating device for providing a controlled power output from energy of the gas flowing in the first path; and
controlling a flow of gas in the second path so that a controlled mass flow of gas to the ullage occurs through the gas circuit independent of variation of a mass of gas flow in the first and second paths.

26. A method of generating a power output in accordance with claim 23 wherein:
the power output is a function of a command applied to a controller which controls the flow of gas through the paths.

27. A method of generating a power output in accordance with claim 26 wherein:
the command is a position command for controlling a vector of thrust produced by a propulsion engine having an orientation controlled by an actuator driven by the power output.

* * * * *